(12) United States Patent
Suchecki et al.

(10) Patent No.: US 8,701,611 B2
(45) Date of Patent: Apr. 22, 2014

(54) ENGINE DRIVE SYSTEM

(75) Inventors: Tom Suchecki, Sterling Heights, MI (US); Chris David Tiernan, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 13/312,461

(22) Filed: Dec. 6, 2011

(65) Prior Publication Data

US 2013/0139773 A1    Jun. 6, 2013

(51) Int. Cl.
*F01L 1/02* (2006.01)

(52) U.S. Cl.
USPC ................................ 123/90.31; 123/90.27

(58) Field of Classification Search
USPC ................. 123/90.31, 90.27, 90.29
See application file for complete search history.

(56) References Cited

U.S. PATENT DOCUMENTS

| | | | |
|---|---|---|---|
| 1,300,518 A * | 4/1919 | Tone | 123/55.1 |
| 3,732,855 A * | 5/1973 | Jackson | 123/90.31 |
| 4,674,452 A | 6/1987 | Asanomi | |
| 5,123,385 A | 6/1992 | Sado et al. | |
| 5,931,127 A | 8/1999 | Buck et al. | |
| 6,932,039 B2 * | 8/2005 | Takahashi et al. | 123/90.17 |
| 7,455,039 B2 * | 11/2008 | Nakayama | 123/90.31 |
| 7,469,180 B2 | 12/2008 | Yasui et al. | |
| 7,845,323 B2 | 12/2010 | Neuboeck | |
| 8,413,625 B2 * | 4/2013 | D'Epiro et al. | 123/90.31 |
| 2002/0033152 A1 * | 3/2002 | Hara et al. | 123/90.29 |
| 2004/0206323 A1 * | 10/2004 | Shintani | 123/90.31 |
| 2010/0192917 A1 | 8/2010 | Akihisa et al. | |

* cited by examiner

*Primary Examiner* — Thomas Denion
*Assistant Examiner* — Steven D Shipe
(74) *Attorney, Agent, or Firm* — Julia Voutyras; Alleman Hall McCoy Russell & Tuttle LLP

(57) ABSTRACT

A system for an engine drive that engages a timing band with a camshaft and a crankshaft is provided. The system further includes a coupling device that couples the camshaft to another camshaft that is not engaged with the timing band. The coupling device and the camshafts are in such a configuration that the camshafts rotate in opposing directions.

17 Claims, 3 Drawing Sheets

ENGINE DRIVE SYSTEM

BACKGROUND AND SUMMARY

Vehicles may use an engine drive system to drive various features in an internal combustion engine. For example, a typical engine drive system for a dual overhead camshaft arrangement includes a timing belt that engages various sprockets to rotate both camshafts and a crankshaft rotate.

For example, U.S. Pat. No. 4,674,452 describes a camshaft driving system for a dual overhead cam engine. The system includes a chain that engages a crankshaft and an intake camshaft. Further, the intake camshaft includes a gear that meshes with an exhaust camshaft gear such that an exhaust camshaft is driven in synchronization with the intake camshaft.

The inventors herein have recognized various issues with the above system. In particular, engaging toothed gears to synchronize the rotation of the camshafts also causes center distance limitations due to noise, vibration, and harshness (NVH) constraints and package constraints.

As such, one example approach to address the above issues is to couple the camshafts with a coupling device. In this way, it is possible to indirectly couple the camshafts, while reducing timing band load.

Specifically, in one embodiment, the coupling device engages a first camshaft via a drive pin and a second camshaft via a driven pin such that a position of the first camshaft is mirrored from a position of the second camshaft. This configuration enables the camshafts to rotate in opposing directions without directly engaging the camshafts with toothed sprockets. In this way, it is possible to engage only one drive camshaft with a timing band and the drive camshaft indirectly drives a driven camshaft that is not engaged with the timing band. Further, by rotating the camshafts in opposing directions, it is possible to take advantage of torque cancellation. As such, torque cancellation can reduce the timing band load resulting in improved durability, performance and fuel economy.

Note that various bands may be used, such as timing chain, a timing belt, or various other types of elastic and/or inelastic flexible bands. Further, the band may mate to toothed or un-toothed pulleys on the various shafts. Further still, additional bands may also be used, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are drawn approximately to scale.

DETAILED DESCRIPTION

The following description relates to an engine drive system that uses a sprocket coupling device to couples a first camshaft to a second camshaft such that the camshafts rotate in opposing directions. This arrangement allows a timing band to engage only one camshaft, while the sprocket coupling device enables a kinetic energy of the first camshaft to be transferred to the second camshaft. By rotating the camshafts in opposite directions, it is possible to take advantage of torque cancellation. Further, torque cancellation can reduce loading on the timing band which increases durability of the band, performance of the engine drive system, and as a result fuel economy is improved. Further, this engine drive system allows for a more compact design with a lower weight than traditional designs due to the resulting geometric configuration.

Various accessory drives may be included in the disclosed engine drive system. For example, an oil pump and a balance shaft may be driven by the disclosed engine drive system, if desired. Additionally, the engine drive system may include various pulleys, idlers and tensioning devices to further ensure a reflex wrap angle, if desired.

Figure 1:
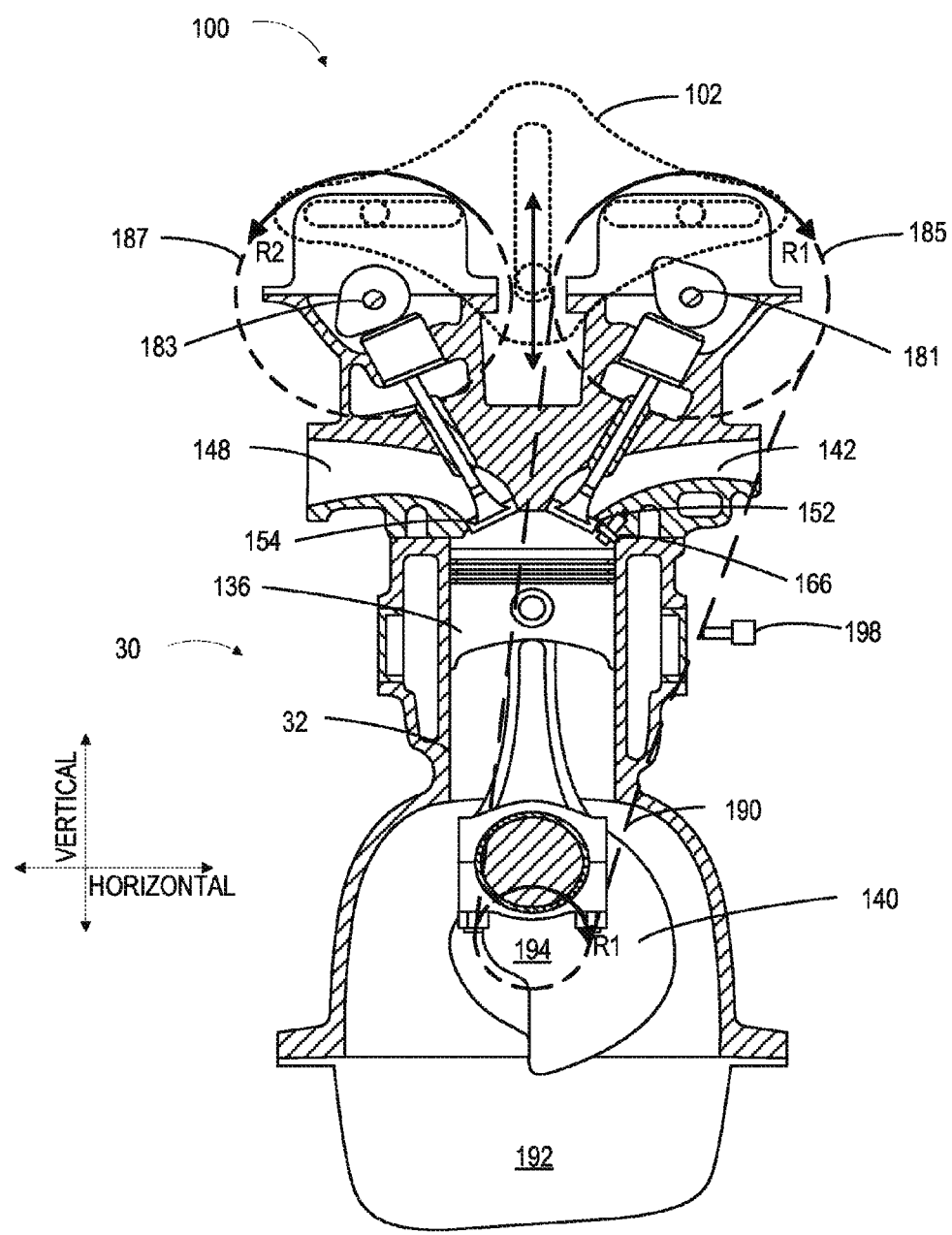
FIG. 1 schematically shows an example engine drive system including a cam drive mechanism, according to an embodiment of the present disclosure.

FIG. 1 shows a schematic diagram of an example engine 10 showing one cylinder of a multi-cylinder inline engine.

Combustion cylinder 30 of a multi-cylinder engine may include combustion cylinder walls 32 with piston 136 positioned therein. Piston 136 may be coupled to crankshaft 140 so that reciprocating motion of the piston is translated into rotational motion of the crankshaft. Crankshaft 140 may be coupled to crankshaft sprocket 194 and crankshaft 140 may also be coupled to at least one drive wheel of a vehicle via an intermediate transmission system (not shown). Further, a starter motor (not shown) may be coupled to crankshaft 140 via a flywheel to enable a starting operation of the multi-cylinder engine. Crankshaft 140 may be lubricated with oil contained within oil sump 192.

Combustion cylinder 30 may receive air via intake passage 142 and may exhaust combustion gases via exhaust passage 148. Intake passage 142 and exhaust passage 148 may selectively communicate with combustion cylinder 30 via respective intake valve 152 and exhaust valve 154. In some embodiments, combustion cylinder 30 may include two or more intake valves and/or two or more exhaust valves.

In this example, intake valve 152 and exhaust valve 154 may be stimulated by camshafts 181 and 183 respectively, shown here as including camshaft lobes. Intake valve 152 and exhaust valve 154 may be further controlled by one or more cam actuation systems (not shown) which may each include one or more cams and may utilize one or more of cam profile switching (CPS), variable cam timing (VCT), variable valve timing (VVT) and/or variable valve lift (VVL) systems that may be operated by a controller to vary valve operation. The position of intake valve 152 and exhaust valve 154 may be determined by position sensors and intake valve 152 and/or exhaust valve 154 may be controlled by electric valve actuation.

Fuel injector 166 is shown coupled directly to combustion cylinder 30 for injecting fuel directly therein in proportion to the pulse width of signal FPW received from a controller. In this manner, fuel injector 166 provides what is known as direct injection of fuel into combustion cylinder 30. The fuel injector may be mounted on the side of the combustion cylinder or in the top of the combustion cylinder, for example. Fuel may be delivered to fuel injector 166 by a fuel delivery system (not shown) including a fuel tank, a fuel pump, and a fuel rail. In some embodiments, combustion cylinder 30 may alternatively or additionally include a fuel injector arranged in intake passage 142 in a configuration that provides what is known as port injection of fuel into the intake port upstream of combustion cylinder 30.

The engine drive system 100, as shown in FIG. 1, uses a band 190 to synchronize various rotating parts. Band 190 may be a timing belt or timing chain, and may be formed as a single continuous band that follows a serpentine path. Band 190 may be a timing belt such as a V-belt or a V-ribbed belt, or band 190 may be a timing chain. Band 190 may have chain links coupled to each other with pins or band 190 may otherwise have chain elements with holes that engage with sprocket teeth. Alternatively, band 190 may be a rubber belt without holes. Band 190 may engage and couple the camshafts and crankshafts via various devices such as sprockets. Further, the band 190 may engage and couple various additional accessory devices via devices such as sprockets. Moreover, band 190 may engage additional devices such as pulleys and/or idlers.

In one example, band 190 may engage toothed sprockets, where holes in the band align with the teeth of the sprocket. In another example, band 190 may contact a device without teeth such that a surface of the band may be in contact with a surface of the device, where the surface of the device may include a groove. Band 190 may contact each device with a wrap angle, which for one or more devices is a reflex wrap angle. Here, the wrap angle corresponds to an arc length of contact between the band 190 and the various sprockets, pulleys, etc. and a reflex wrap angle may be 180 degrees or more, but less than 360 degrees. Additionally, band 190 may engage some devices with a wrap angle that is smaller than a reflex wrap angle.

Camshaft 181 is shown coupled to band 190 via camshaft sprocket 185. Camshaft 181 and camshaft sprocket 185 are coupled such that they rotate together in a direction R1. Further, sprocket 185 is shown coupled to a coupling device 102 via a drive pin 104.

Camshaft 183 is shown coupled to camshaft sprocket 187, and notably, camshaft sprocket 187 does not engage with band 190. Further, camshaft sprocket 187 is coupled to the coupling device via a driven pin 106. As described in more detail below, the coupling device may be coupled to both camshaft sprockets such that camshaft sprocket 187 is rotated in an opposite direction from camshaft sprocket 185. Therefore, camshaft 183 and camshaft sprocket 187 are coupled such that they rotate together in a direction R2, which is opposite from direction R1. By rotating the camshafts in opposite directions, it is possible to take advantage of torque cancellation. Further, torque cancellation can reduce loading on band 190 which increases durability of the band, performance of the engine drive system, and as a result fuel economy is improved.

Camshaft sprockets 185 and 187 are shown with a diameter that is twice the diameter of crankshaft sprocket 194 to provide desired timing of intake valve 152 and exhaust valve 154 during the four-stoke combustion cycle. Alternatively, camshaft sprockets 185 and 187 may be another size, if desired.

Crankshaft 140 is shown coupled to band 190 via crankshaft sprocket 194 such that crankshaft 140 and crankshaft sprocket 194 rotate together. Further, crankshaft 140 and corresponding crankshaft sprocket 194 rotate in a direction R1. In this way, crankshaft 140 is configured such that its direction of rotation is the same as camshaft 181 and opposite that of camshaft 183.

Tensioning device 198 is shown engaged with band 190. Tensioning device 198 may employ various pulleys, springs, levers and other adjustment mechanisms to actively adjust the tension of band 190 which may ensure a reflex wrap angle around each sprocket, idler, pulley and the like. However, it will also be appreciated that engine drive system 100 may include sprockets, idlers and pulleys with a smaller wrap angle.

It will be appreciated that the drive system may include additional and/or alternative components than those illustrated in FIG. 1. For example, the engine drive system may include one or more accessory devices that may be coupled to band 190 via a device sprocket. The accessory devices may include one or more of an oil pump, a balance shaft, a water pump, a power steering pump, an air conditioning compressor, a fan, and a fuel pump, which are provided as non-limiting examples.

Further, the engine drive system may include an idling device. For example, the idling device may be a pulley or a sprocket. It will be appreciated that engine drive system 100 may include more than one idling device 189 and each idling device may engage band 190 with a first contacting side 127 and/or a second contacting side 129.

Further, it is to be appreciated that one or more of the aforementioned accessory drives, tensioning devices, sprockets, pulleys, and/or idlers may engage first contacting side 127 or second contacting side 129 of band 190. Thus, it will be appreciated that band 190 is not limited to a path as illustrated in FIG. 1. For example, band 190 may follow a serpentine path to engage various devices at various locations in engine 10.

As described above, FIG. 1 shows only one cylinder of a multi-cylinder engine, and each cylinder may similarly include its own set of intake/exhaust valves, camshafts, crankshafts and accessory devices etc. coupled to the engine drive system 100, or alternatively coupled to another drive system.

Figure 2A:
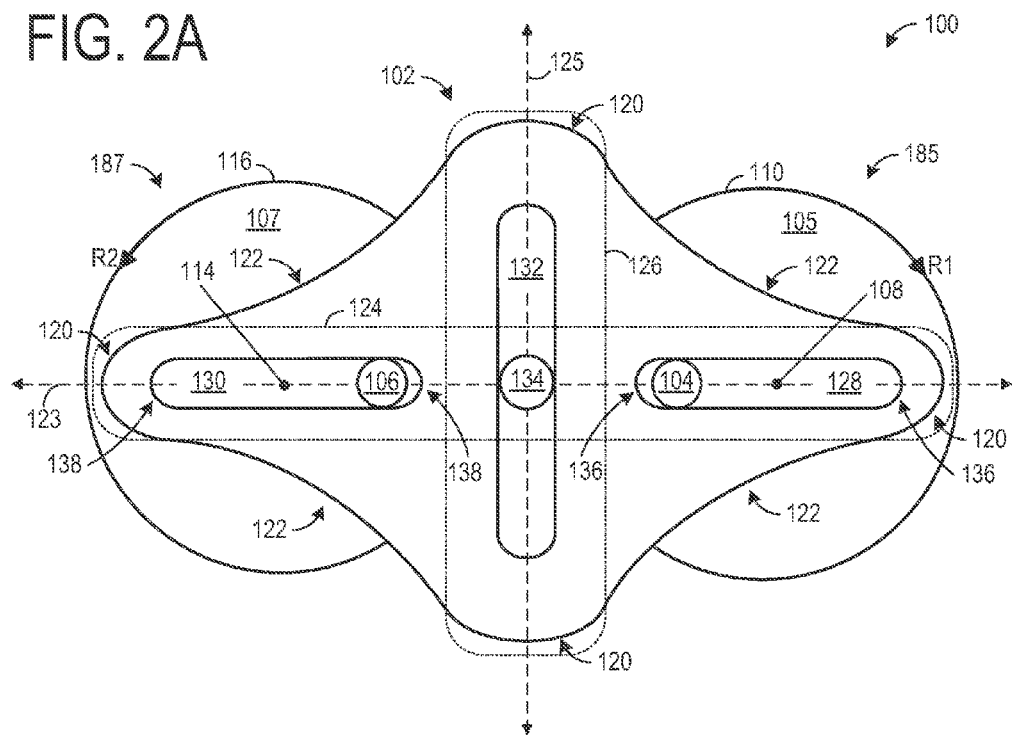
FIG. 2A schematically shows a perspective view of the cam drive mechanism of FIG. 1.

FIG. 2A shows a schematic of cam drive mechanism 100 according to an embodiment of the present disclosure. Cam drive mechanism 100 may include a first camshaft sprocket 185, a second camshaft sprocket 187, and a sprocket coupling device 102.

Camshaft sprocket 185 may be coupled to drive pin 104, as shown. Drive pin 104 may be attached to a surface 105 of camshaft sprocket 185 at a position between a center 108 of the sprocket and a perimeter 110 of the sprocket. For example, a center of drive pin 104 may be a distance 112 from the center 108. Therefore, drive pin 104 may rotate about center 108 when the vehicle is in operation. As such, drive pin 104 may rotate about an axis (e.g. a camshaft axis) at a radius that is less than a radius of sprocket 185.

Camshaft sprocket 187 may be coupled to a driven pin 106, as shown. Driven pin 106 may be attached to a surface 107 of camshaft sprocket 187 at a position between a center 114 of the sprocket and a perimeter 116 of the sprocket. For example, a center of driven pin 106 may be a distance 118 from the center 114. Therefore, driven pin 106 may rotate about center 114 when the vehicle is in operation. As such, driven pin 106 may rotate about an axis (e.g. a camshaft axis) at a radius that is less than a radius of sprocket 187.

As shown, sprocket coupling device 102 may be a rhombus-like shape. For example, coupling device 102 may be a rhombus with rounded corners 120. Further, the rounded rhombus may include sides 122 that are concave. Further, coupling device 102 may have two axes of symmetry. For example, coupling device may be symmetrical with respect to a horizontal axis 123 and a vertical axis 125, as shown. However, in some embodiments, the coupling device may have more than two axes of symmetry, one axis of symmetry, or the coupling device may be asymmetrical. Further, a horizontal section 124 may be longer than a vertical section 126. Further still, vertical section 126 may be wider than horizontal section 124. However, it will be appreciated that the relative shapes and sizes of the horizontal and vertical sections may differ from the illustrative embodiment without departing from the scope of this disclosure.

Further, coupling device 102 may include a plurality of apertures wherein each aperture is configured to engage a pin such that the pin is slidingly engaged with the coupling device. For example, coupling device 102 may include a first aperture 128 that engages drive pin 104, a second aperture 130 that engages driven pin 106, and a third aperture 132 that engages a fixed pin 134. Fixed pin 134 may be attached to the engine, and therefore, fixed pin 134 may couple the coupling device to the engine. As such, the fixed pin may be a static component of the cam drive mechanism. However, the static fixed pin may enable the coupling device to move vertically. As such, the fixed pin may slidingly attach the coupling device to the engine.

First aperture 128 may be an oblong shape that has a longer horizontal length than a vertical length. For example, the horizontal length may be smaller than a diameter of sprocket 185. Further, the vertical length may be slightly greater than a diameter of drive pin 104. Additionally, aperture 128 may have rounded corners. For example, aperture 128 may have a curvature at each end 136 that is approximately equal to a curvature of drive pin 104. However, it will be appreciated that the relative curvatures of the coupling device and each aperture may differ to some degree. In this way, aperture 128 accommodates drive pin 104 such that drive pin 104 is free to move within first aperture 128.

For example, aperture 128 may enable drive pin 104 to move within a defined space of aperture 128. Thus, aperture 128 may track a movement of drive pin 104. For example, aperture 128 may enable drive pin 104 to move horizontally. In this way, aperture 128 tracks the movement of drive pin 104 and constrains the movement of drive pin 104 to the horizontal direction. Further, since drive pin 104 is driven by band 190 engaging with sprocket 185 in the rotational direction R1, drive pin 104 drives a movement of coupling device 102.

Second aperture 130 may be an oblong shape that has a longer horizontal length than a vertical length, similar to first aperture 128. For example, the horizontal length may be smaller than a diameter of sprocket 187. Further, the vertical length may be slightly greater than a diameter of driven pin 106. Additionally, aperture 130 may have rounded corners. For example, aperture 130 may have a curvature at each end 138 that is approximately equal to a curvature of drive pin 106. In this way, aperture 130 accommodates driven pin 106 such that driven pin 106 is free to move within second aperture 130.

For example, second aperture 130 may enable driven pin 106 to move within a defined space of second aperture 130, similar to first aperture 128 and drive pin 104. Thus, aperture 130 may track a movement of driven pin 106. For example, aperture 130 may enable driven pin 106 to move horizontally. In this way, aperture 130 tracks the movement of driven pin 106 and constrains the movement of driven pin 106 to the horizontal direction. Further, since sprocket 187 does not engage with band 190, driven pin 106 is driven by the movement of coupling device 102, and thus, the movement of driven pin 106 enables sprocket 187 to rotate in the direction R2. As described above, direction R2 is opposite from direction R1. In other words, sprocket 185 may rotate in a clockwise direction and sprocket 187 may rotate in a counter clockwise direction.

Third aperture 132 may be configured to allow vertical movement of coupling device 102. Since third aperture 132 is configured to engage fixed pin 134, which is a static pin (e.g., attached to engine 10), the coupling device may be constrained such that the coupling device may only move along vertical axis 125.

In this way, coupling device 102 is coupled to both sprocket 185 and sprocket 187. Further, the first and second apertures enable horizontal movement of the drive pin and the driven pin respectively, and the third aperture enables vertical movement of the coupling device. Thus, the combined tracking features of the coupling device enable rotational movement of sprockets 185 and 187. Further, since sprocket 185 is rotatably engaged with band 190 and sprocket 187 is not rotatably engaged with band 190, coupling device 102 is configured to transfer kinetic energy from sprocket 185 to sprocket 187. For example, coupling device 102 may be configured to transfer the rotation of sprocket 185 to sprocket 187 such that sprocket 187 rotates in a direction that is opposite from sprocket 185, as described in more detail below with respect to FIGS. 3A-3D.

It will be appreciated that first and second apertures may be equivalent in shape and size. Further, second aperture 130 may be a reflection of first aperture 128 across vertical axis 125. Third aperture 132 may have similar dimensions as first and second apertures, or third aperture 132 may have a different dimension. As one example, third aperture 132 may have a vertical length that is greater than a horizontal length of the first and second apertures. It will be appreciated that third aperture 132 may vary from first and second apertures in other ways, if desired. For example, fixed pin 134 may have a greater diameter or a smaller diameter than the drive pin and the driven pin. Thus, the third aperture may be an appropriate size to accommodate such a fixed pin.

It will be appreciated that cam drive mechanism 100 is provided by way of example, and thus, is not meant to be limiting. Rather, cam drive mechanism 100 is provided to illustrate a general concept, as coupling device 102 may be various geometric configurations to couple one cam sprocket to another to enable the cam sprockets to rotate in opposing directions. Thus, it is to be understood that the cam drive mechanism illustrated in FIG. 2A may include additional and/or alternative features than those depicted without departing from the scope of this disclosure.

Figure 2B:
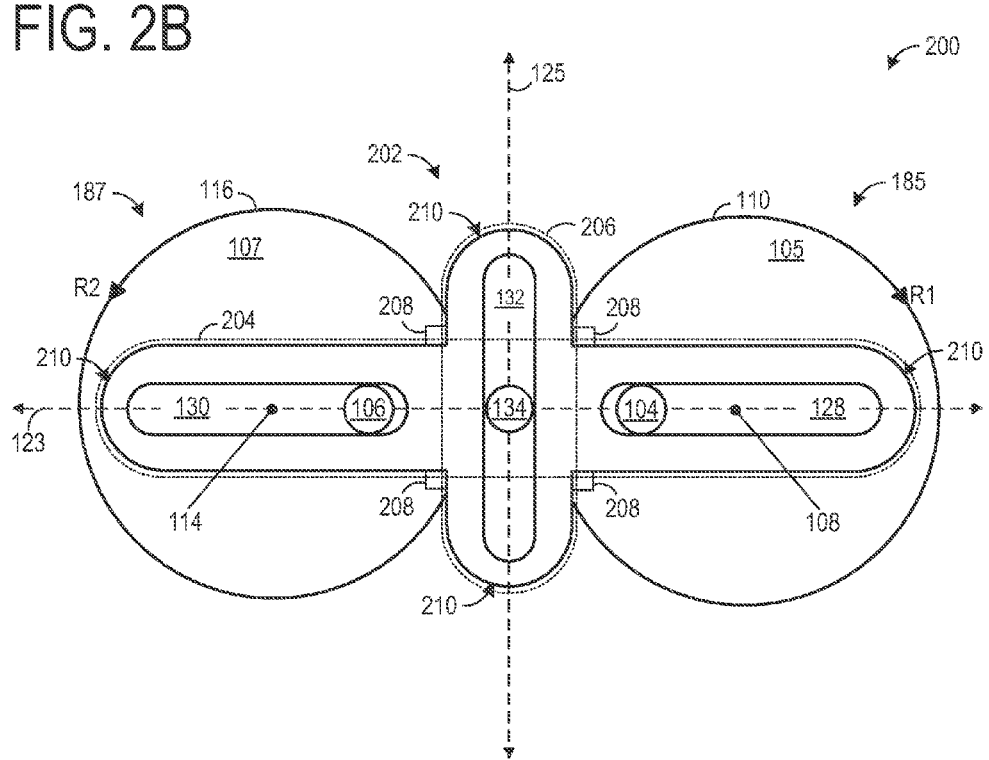
FIG. 2B schematically shows a perspective view of another cam drive mechanism according to an embodiment of the present disclosure.

For example, FIG. 2B shows a schematic of a cam drive mechanism 200 according to an embodiment of the present disclosure. It will be appreciated that cam drive mechanism 200 may be similar to cam drive mechanism 100. As such, like features are indicated with common reference numbers, and such features will not be discussed repetitively for the sake of brevity.

As shown, cam drive mechanism 200 includes a coupling device 202. Similar to coupling device 102, coupling device 202 may have two axes of symmetry. For example, coupling device 202 may be symmetrical about horizontal axis 123 and vertical axis 125. However, in some embodiments, the coupling device may have more than two axes of symmetry, one axis of symmetry, or the coupling device may be asymmetrical. Further, coupling device 202 may include a plurality of apertures to engage various pins similar to coupling device 102.

Coupling device 202 may be a cross-like shape. For example, coupling device 202 may be two rounded rectangles that share a common center. In other words, coupling device 202 may be two rounded rectangles that coalesce to form the cross-like shape such that two axes of symmetry are maintained. As shown, a horizontal section 204 may be longer than a vertical section 206, and the two sections may intersect at right angles 208. However, it is to be understood that coupling device 202 may have another geometry without departing from the scope of this disclosure. For example, the horizontal and vertical sections may coalesce such that another angle is formed at the intersection of such sections. As another example, the intersection may include a concave or convex surface that transitions between the horizontal and vertical sections. Further, ends 210 may have a similar curvature as compared to an end curvature of each aperture. However, ends 210 may have a curvature that is different from the end curvature of each aperture.

It will be appreciated that cam drive mechanism 200 is provided by way of example, and thus, is not meant to be limiting. Rather, cam drive mechanism 200 is provided to illustrate a general concept, as coupling device 200 may be various geometric configurations to couple one cam sprocket to another to enable the cam sprockets to rotate in opposing directions. Thus, it is to be understood that the cam drive mechanism illustrated in FIG. 2B may include additional and/or alternative features than those depicted without departing from the scope of this disclosure. For example, the coupling device may include two vertical apertures each engaging a sprocket pin, and a horizontal aperture that engages a fixed pin. Further, it will be appreciated that the coupling device may be coupled to each sprocket in various ways. For example, the drive pin and/or the driven pin may be a crank throw to couple the coupling device to each sprocket. Further, it is to be understood that the pins, crank throws, etc. may the engage coupling device such that coupling device walk out is reduced. In other words, the pins, crank throws, etc may include a circumferential groove that engages an aperture such that a constant spacing between the coupling device and the sprockets is maintained.

FIGS. 3A-3D show cam drive mechanism 200 at various different positions. In sequence, FIGS. 3A-3D show a rotation of sprocket 185 and 187 over time. As described above, the coupling device is coupled to sprocket 185 and 187 such that the sprockets rotate in opposing directions. Further, it will be appreciated that while not shown in FIGS. 3A-3D, band 190 drives the rotation of sprocket 185, which in turn, drives a vertical movement of the coupling device. As described above, the coupling device is configured to drive the rotation of sprocket 187 by transferring the kinetic energy of sprocket 185 to sprocket 187.

Further, FIGS. 3A-3D include lines 300 to illustrate a spatial relationship between a center of drive pin 104 and a center of sprocket 185, and likewise, a spatial relationship between a center of driven pin 106 and a center of sprocket 187. It is to be understood that lines 300 are provided to illustrate a general concept and may not be physically included in cam drive mechanism 200.

Figure 3A:
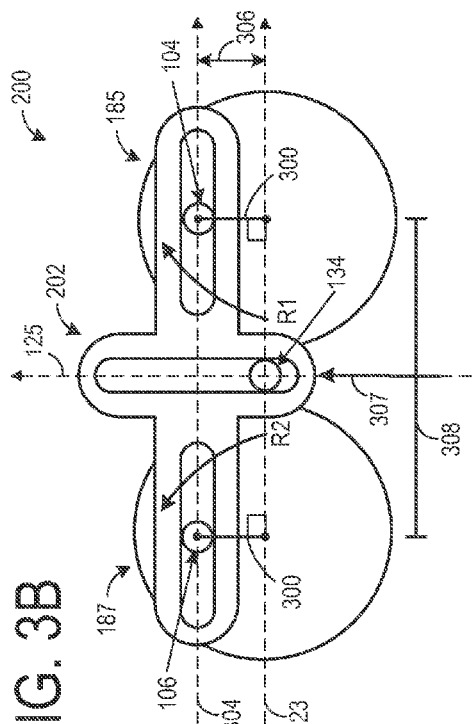
FIGS. 3A-D schematically show various positions of the cam drive mechanism of FIG. 2B.

FIG. 3A shows the cam drive mechanism at a first position. The first position may be referred to herein as a reference position by which to describe other positions of the cam drive mechanism. As such, the first position may also be referred to as a 0° cam degree position.

At the 0° cam degree position, drive pin 104, fixed pin 134, and driven pin 106 may be aligned such that each pin aligns with horizontal axis 123, as shown. In other words, horizontal axis 123 may bisect drive pin 104, fixed pin 134, and driven pin 106. Since the drive pin and the driven pin are dynamic pins, these pins may be temporarily aligned with horizontal axis 123. Therefore, drive pin 104 and driven pin 106 may be periodically bisected by horizontal axis 123. Conversely, the fixed pin may be permanently associated with horizontal axis 123 since fixed pin 134 is a static pin.

Further, the center of drive pin 104 may be a distance 302 from the center of driven pin 106. Distance 302 may be a shortest distance between the drive pin and the driven pin, as compared to positions other than the 0° cam degree position.

Figure 3B:
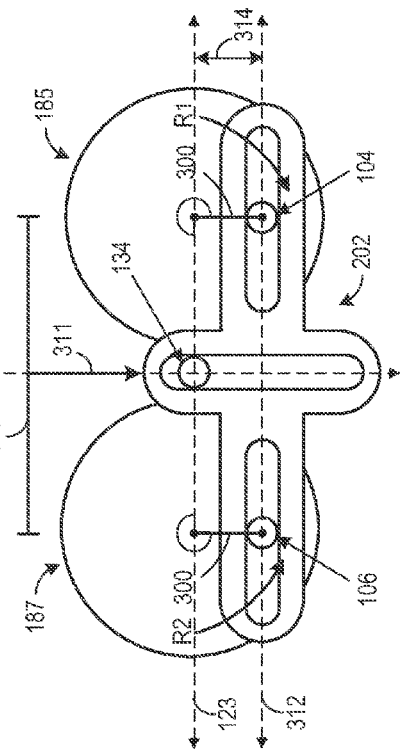

FIG. 3B shows the cam drive mechanism at a second position. As shown, the second position may be rotated 90° from the first position. Thus, the second position may be a 90° cam degree position.

At the 90° cam degree position, drive pin 104 and driven pin 106 may be aligned with each other such that each pin aligns with horizontal axis 304, as shown. In other words, horizontal axis 304 may bisect drive pin 104 and driven pin 106. Further, horizontal axis 304 may be spaced apart from horizontal axis 123 by a vertical distance 306.

Further, at the 90° cam degree position, the center of drive pin 104 may be a distance 308 from the center of driven pin 106. Distance 308 may be greater than distance 302.

In this way, a rotation of sprocket 185 in the direction R1 drives a vertical movement of coupling device 202 in a direction generally indicated by arrow 307. Since the coupling device is coupled to both sprockets 185 and 187, and a position of sprocket 187 is mirrored from sprocket 185 about vertical axis 125, the vertical movement of coupling device 202 drives rotational movement of sprocket 187 in the direction R2.

Figure 3C:
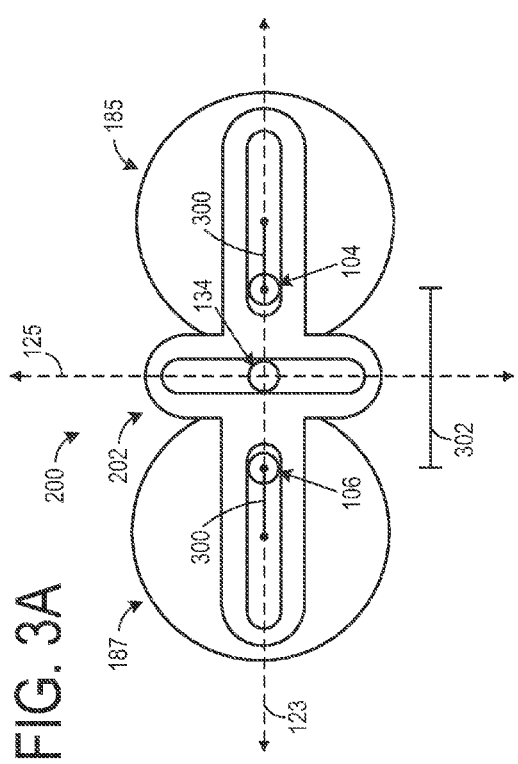

FIG. 3C shows the cam drive mechanism at a third position. As shown, the third position may be rotated 180° from the first position. Thus, the third position may be a 180° cam degree position.

At the 180° cam degree position, drive pin 104, fixed pin 134, and driven pin 106 may be aligned such that each pin aligns with horizontal axis 123, as shown. In other words, horizontal axis 123 may bisect drive pin 104, fixed pin 134, and driven pin 106, similar to the 0° cam degree position.

Further, at the 180° cam degree position, the center of drive pin 104 may be a distance 310 from the center of driven pin 106. Distance 310 may be greater than distances 302 and 308. Further, distance 310 may be a longest distance between the drive pin and the driven pin, as compared to positions other than the 180° cam degree position.

In this way, a rotation of sprocket 185 in the direction R1 drives a vertical movement of coupling device 202 in a direction generally indicated by arrow 309. Since the coupling device is coupled to both sprockets 185 and 187, and a position of sprocket 187 is mirrored from sprocket 185 about vertical axis 125, the vertical movement of coupling device 202 drives rotational movement of sprocket 187 in the direction R2.

Figure 3D:
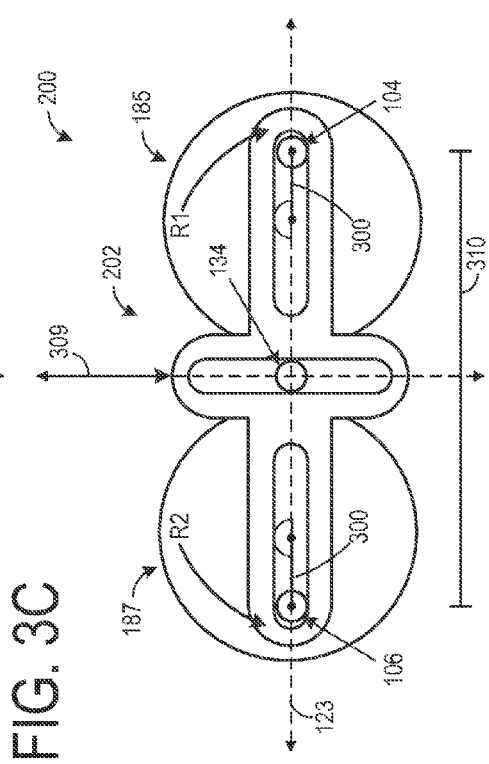

FIG. 3D shows the cam drive mechanism at a fourth position. As shown, the fourth position may be rotated 270° from the first position. Thus, the fourth position may be a 270° cam degree position.

At the 270° cam degree position, drive pin 104 and driven pin 106 may be aligned with each other such that each pin aligns with horizontal axis 312, as shown. In other words, horizontal axis 312 may bisect drive pin 104 and driven pin 106. Further, horizontal axis 312 may be spaced apart from horizontal axis 123 by a vertical distance 314. Further, a value of vertical distance 314 may be approximately equal to a value of vertical distance 306. In other words, the 270° cam degree position may be a reflection of the 90° cam degree position over horizontal axis 123.

Further, at the 270° cam degree position, the center of drive pin 104 may be a distance 316 from the center of driven pin 106. Distance 316 may be greater than distance 302. Further, a value of distance 316 may be approximately equal to a value of distance 308.

In this way, drive pin 104 (and likewise sprocket 185) rotates in a direction R1, which drives a vertical movement of the coupling device in a direction generally indicated by arrow 311, which also drives a rotational movement of driven pin 106 (and likewise sprocket 187) in a direction R2, opposite of R1. In other words, sprocket 185 indirectly drives the rotation of sprocket 187 due to the geometric configuration of the coupling device. Since the coupling device couples both sprockets such that sprocket 185 is a mirror image of sprocket 187 at each cam degree position, the sprockets may rotate in opposing directions. Therefore, band 190 may engage sprocket 185 and a rotation of this sprocket can be transferred to sprocket 187 without sprocket 187 being rotatably engaged with band 190.

It will be appreciated that the cam drive mechanism has other various positions, and the 0°, 90°, 180° and 270° cam degree positions are provided as non-limiting examples. For example, it will be appreciated that a 360° cam degree position may be approximately equal to the 0° cam degree position. Further, the cam drive mechanism may rotate such that all cam degree positions between 0° and 360° are enabled. Further still, the can drive mechanism may continue to rotate while the vehicle is in operation to drive various components of the engine.

It will be appreciated that the cam drive mechanisms illustrated in FIGS. 1-3D are provided by way of example, and thus, are not meant to be limiting. Rather, the cam drive mechanisms are provided to illustrate a general concept of rotating the camshafts in opposing directions. Thus, the cam drive mechanisms are not limited to the geometric configurations depicted in FIGS. 1-3D. As such, it will be appreciated that numerous other geometric configurations are possible.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine comprising:
   a first camshaft including a drive pin;
   a second camshaft including a driven pin;
   a crankshaft;
   a timing band rotatably coupling the first camshaft and the crankshaft; and
   a coupling device coupled to the drive pin, the driven pin, and to the engine, vertical movement of the coupling device, generated by rotation of the first camshaft, rotating the second camshaft in an opposite direction.

2. The system of claim 1, wherein the coupling device includes a plurality of apertures.

3. The system of claim 2, wherein a first aperture engages the drive pin, a second aperture engages the driven pin, and a third aperture engages a fixed pin to slidingly attach the coupling device to the engine.

4. The system of claim 3, wherein the first and second apertures are shaped to enable horizontal movement of the drive pin and the driven pin respectively.

5. The system of claim 4, wherein the third aperture is shaped to enable a vertical movement of the coupling device.

6. The system of claim 5, wherein a combination of the horizontal movements of the drive pin and driven pin and the vertical movement of the coupling device enables the rotation of the first camshaft to be transferred to the second camshaft such that the second camshaft is rotated in an opposite direction from the first camshaft.

7. The system of claim 1, wherein the coupling device has two axes of symmetry.

8. The system of claim 7, wherein the coupling device is a rhombus shape including rounded corners and concave sides.

9. The system of claim 7, wherein the coupling device is a cross-like shape including a horizontal section and a vertical section that intersect to form right angles.

10. The system of claim 1, wherein the drive pin is attached to a surface of a drive sprocket coupled to the first camshaft and wherein the driven pin is attached to a surface of a driven sprocket coupled to the second camshaft.

11. The system of claim 10, wherein the driven sprocket has a mirrored position from the drive sprocket about a vertical axis that bisects the coupling device.

12. A system for an engine, comprising:
   a drive device;
   a driven device; and
   a coupling device including a plurality of apertures that slidingly engage the drive device and the driven device to couple the drive device to the driven device such that a rotation of the drive device indirectly drives the driven device, wherein the coupling device is coupled to the drive device and the driven device such that the drive device and the driven device rotate in opposite directions;
   wherein one of the plurality of apertures slidingly engages a fixed pin attached to the engine to constrain a movement of the coupling device to a vertical direction.

13. The system of claim 12, wherein the drive device is a first drive device, the system further comprising a second drive device and a timing band that rotatably engages both the first drive device and the second drive device but not the driven device.

14. The system of claim 12, wherein the coupling device has two axes of symmetry.

15. A system for an engine comprising:
   a first camshaft sprocket including a drive pin;
   a second camshaft sprocket including a driven pin, the second camshaft sprocket in a mirrored position from the first camshaft sprocket; and
   a symmetrical coupling device including a first aperture to slidingly engage the drive pin, a second aperture to slidingly engage the driven pin, and a third aperture to sliding engage a fixed pin attached to the engine, wherein the drive pin and the driven pin are attached to a surface of a respective sprocket at a position between a center of the respective sprocket and a perimeter of the respective sprocket.

16. The system of claim 15, wherein the symmetrical coupling device is symmetrical about a horizontal axis and a vertical axis, and wherein the second camshaft sprocket is in a mirrored position from the first camshaft sprocket about the vertical axis.

17. The system of claim 15, wherein the first and second apertures are an oblong shape with a longer horizontal dimension than a vertical dimension, and wherein the third aperture is an oblong shape with a longer vertical dimension than a horizontal dimension.

* * * * *